(12) United States Patent
Ma et al.

(10) Patent No.: US 11,680,961 B2
(45) Date of Patent: Jun. 20, 2023

(54) PROBE-BASED BIDIRECTIONAL ELECTROPHORETIC FORCE OPTICAL TRAP LOADING METHOD, DEVICE AND APPLICATION

(71) Applicants: Zhejiang Lab, Zhejiang (CN); Zhejiang University, Zhejiang (CN)

(72) Inventors: Yuanyuan Ma, Zhejiang (CN); Cuihong Li, Zhejiang (CN); Zhiming Chen, Zhejiang (CN); Yingying Wang, Zhejiang (CN); Xunmin Zhu, Zhejiang (CN); Huizhu Hu, Zhejiang (CN)

(73) Assignees: Zhejiang Lab, Zhejiang (CN); Zhejiang University, Zhejiang (CN)

( * ) Notice: Subject to any disclaimer, the term of this patent is extended or adjusted under 35 U.S.C. 154(b) by 0 days.

(21) Appl. No.: 17/888,940

(22) Filed: Aug. 16, 2022

(65) Prior Publication Data
US 2022/0390482 A1 Dec. 8, 2022

(30) Foreign Application Priority Data
Aug. 27, 2021 (CN) .......................... 202110993558.4

(51) Int. Cl.
*G01P 15/09* (2006.01)
*G21K 1/00* (2006.01)
*G01P 15/093* (2006.01)

(52) U.S. Cl.
CPC ............ *G01P 15/093* (2013.01); *G21K 1/006* (2013.01)

(58) Field of Classification Search
CPC .................. G01P 15/093; G21K 1/006; G03H 2001/0077
See application file for complete search history.

(56) References Cited

U.S. PATENT DOCUMENTS

| 8,415,613 | B2 * | 4/2013 | Heyn | B82Y 35/00 850/10 |
|---|---|---|---|---|
| 2003/0047676 | A1 * | 3/2003 | Grier | G01N 30/00 250/251 |
| 2004/0244470 | A1 * | 12/2004 | Vicci | G01Q 10/06 73/104 |
| 2005/0121604 | A1 * | 6/2005 | Mueth | B03C 5/005 250/251 |
| 2007/0295920 | A1 * | 12/2007 | Botchway | G01Q 70/10 250/505.1 |

(Continued)

*Primary Examiner* — Sean M Luck

(57) ABSTRACT

A probe-based bidirectional electrophoretic force optical trap loading method includes steps of (1) detaching target particles from an upper electrode plate and capturing the target particles by a micro-scale probe based on a bidirectional electrophoretic force; (2) moving the probe with the target particles over an optical trap, applying a reverse electric field between the probe and the upper substrate electrode plate which is applied during a polar relaxation time of the target particles, and desorbing the target particles from the probe; and (3) turning on the optical trap, applying an electric field between the lower electrode plate and the upper electrode plate, adjusting the speed of the desorbed target particles through the electric field at which the optical trap is able to capture the desorbed target particles and the desorbed target particles moving to the effective capture range of the optical trap.

7 Claims, 2 Drawing Sheets

(56) References Cited

U.S. PATENT DOCUMENTS

| | | | | |
|---|---|---|---|---|
| 2008/0286878 A1* | 11/2008 | Vezenov | ................ | B82Y 35/00 |
| | | | | 422/68.1 |
| 2008/0289404 A1* | 11/2008 | Okajima | ................ | G01Q 60/42 |
| | | | | 73/105 |
| 2009/0032449 A1* | 2/2009 | Mueth | .................... | G01N 15/04 |
| | | | | 210/94 |
| 2014/0182021 A1* | 6/2014 | Gluckstad | .............. | G02B 23/26 |
| | | | | 850/32 |
| 2016/0077127 A1* | 3/2016 | Fiorini | ................... | G01Q 60/22 |
| | | | | 427/532 |
| 2017/0356932 A1* | 12/2017 | Melo Hurtado | ....... | G01N 27/72 |

* cited by examiner

PROBE-BASED BIDIRECTIONAL ELECTROPHORETIC FORCE OPTICAL TRAP LOADING METHOD, DEVICE AND APPLICATION

CROSS REFERENCE OF RELATED APPLICATION

The present invention claims priority under 35 U.S.C. 119(a-d) to CN 202110993558.4, filed Aug. 27, 2021.

BACKGROUND OF THE PRESENT INVENTION

Field of Invention

The present invention relates to a probe-based bidirectional electrophoretic force optical trap loading method, device and application.

Description of Related Arts

In inertial sensors, the initial loading of the sensitive unit is called optical loading. For example, in an electrostatically-suspended accelerometer, the inertial measurement is only able to be performed after the suspension control of the mass block as the stator. The loading technology is a practical key technology of suspended sensor instruments.

The rapid ejection and capture of particles in air or vacuum environment has always been a technical difficulty in the field of optical traps. There are three existing solutions, namely vibration desorption method, spray suspension method and laser acoustic release method. The vibration desorption method is to make dry powder particles detach from the surface of the substrate through high-frequency vibration of piezoelectric ceramics. The spray suspension method is to atomize the suspension of particles, so that the small droplets wrapped with the particles are scattered into the free space. The laser acoustic release method uses a high-energy pulsed laser to act on the substrate to generate high-energy acoustic waves, so that particles are desorbed from the substrate and enter the free space. These three solutions have different applicable scenarios. Since the adhesion forces of the particles on the substrate is inversely proportional to the square of the diameter of the particles, the smaller the particle size, the higher the requirements for the drive capability of the piezoelectric device for the vibration desorption method, and accordingly this method is only suitable for microns-sized particles. For smaller nanoparticles, the spray suspension method mostly uses a highly volatile solution (such as propanol), so that the solution components in the droplets are able to be quickly volatilized without affecting the capture of the particles. The laser acoustic release method is able to release the particles with different sizes in vacuum or air environment by controlling the energy of a single pulse.

During the implementation of the optical loading technology, the particles have a certain initial velocity after leaving the surface of the carrier, and additional dissipation mechanisms are required to achieve stable capture. Since the gradient force that forms the potential well in the optical trap force is a conservative force, if the external damping force is not used to reduce the optical loading speed of the particles, the particles are unable to be stably captured by the optical trap. The existing optical loading methods all use air damping to reduce the optical loading speed of the particles, so they are only able to be carried out under normal pressure, and the experimental pressure is pumped to a vacuum after the particles are captured. Moreover, during the process of vacuumizing, if no auxiliary cooling means are applied, the particles will escape from the optical trap due to airflow, vibration, heat absorption and other factors.

Most of the existing optical trap loading methods are unable to directly achieve the stable capture of particles in high vacuum environment, and are not compatible with vacuum optical trap systems. In addition, the operation process of vacuumizing after capturing under normal pressure also increases the duration of the vacuum optical trap experiment and the complexity of operation. In CN 112466506 A, the particles released by the local laser pulse combined with the optical trap and the Paul trap are able to realize the precise optical loading of the particles under vacuum. However, this method is high in complexity of the device, and is difficult to solve the application problem of optical trap integration.

SUMMARY OF THE PRESENT INVENTION

To overcome the deficiencies of prior arts, the present invention provides a probe-based bidirectional electrophoretic force optical trap loading method, device and application.

A probe-based bidirectional electrophoretic force optical trap loading method comprises steps of:

(1) in vacuum or air environment, detaching target particles from an upper electrode plate and capturing the target particles by a micro-scale probe based on a bidirectional electrophoretic force;

(2) moving the probe with the target particles over an optical trap, forming a reverse bidirectional electrophoretic force by applying a reverse electric field between the probe with the target particles and the upper electrode plate, wherein the reverse electric field is applied during a polar relaxation time of the target particles, and desorbing the target particles from the probe; and (3) turning on the optical trap, applying an electric field between the lower electrode plate and the upper electrode plate, adjusting a speed of the desorbed target particles through the electric field at which the optical trap is able to capture the desorbed target particles, the desorbed target particles moving to an effective capture range of the optical trap, and turning off the reverse electric field in the step (2) and the electric field in the step (3) when the desorbed target particles are trapped.

Preferably, the probe has an arrayed structure for releasing the target particles and trapping the target particles by the optical trap for many times.

Preferably, a position of probe is movable.

Also, the present invention provides a probe-based bidirectional electrophoretic force optical trap loading device, which comprises a probe, an upper electrode plate, a power supply, an optical trap, a lower electrode plate, a displacement adjuster and a control unit, wherein one or more target particles are provided on a surface of the upper electrode plate, the upper electrode plate has a central hole, the power supply is configured to control a voltage between the probe and the upper electrode plate and a voltage between the upper electrode plate and the lower electrode plate, the displacement adjuster is configured to adjust a relative position between the probe and the upper electrode plate; after desorbing from the probe, the target particles fall through the central hole of the upper electrode plate, and then are adjusted in falling speed by an electric field between the upper electrode plate and the lower electrode plate, and then are captured after entering an effective capture range of the optical trap; the control unit is configured to control the displacement adjuster, and to control voltages V1, V2 and V3 of the power supply and a turning-on time of the optical trap by timing.

Preferably, the probe is installed on the displacement adjuster.

Preferably, an insulating layer is coated on a surface of the probe for avoiding short-circuit of the probe.

Also, the present invention provides an operation method of the probe-based bidirectional electrophoretic force optical trap loading device, wherein:

the target particles are silica microspheres with a diameter of 5 μm, a vacuum degree is in a range of $10^{-6}$ of $10^{-2}$ mbar, the voltage V1 is in a range of 0 to 5 V, the voltage V2 is in a range of −1000 V to −400 V, a switching time between the voltage V1 and the voltage V2 is smaller than 0.1 ms, a pulse width of the voltage V2 is in a range of 1 ms to 10 ms, the voltage V3 is in a range of 0 to 10 V, the optical trap is formed by a focused beam emitted by a laser with a wavelength of 1064 nm;

the operation method comprises steps of:

(A) at $t_0=0$, capturing the target particles through the probe by applying the voltage V1 between the probe and the upper electrode plate;

(B) moving the probe over the optical trap, and locating the target particles to be released over the optical trap by adjusting the displacement adjuster;

(C) turning on the optical trap, and applying the voltage V3 between the upper electrode plate and the lower electrode plate which is provided under the optical trap;

(D) during time $t_1$, switching the voltage between the probe and the upper electrode plate from V1 to V2, maintaining the voltage V2 for time $t_2$, desorbing the target particles from the probe, and decelerating the desorbed target particles under an action of the voltage V3 between the upper electrode plate and the lower electrode plate which is provided under the optical trap; and (E) the desorbed target particles entering an effective capture area of the optical trap after time $t_3$, capturing the desorbed target particles by the optical trap, and turning off the power supply.

Beneficial effects of the present invention are as follows.

The present invention proposes a solution which is capable of realizing optical trap loading particles in vacuum or air environment, so as to solve the problem of difficulty in precise optical loading in existing loading methods. Through the microfabrication of the arrayed probe, the present invention is able to be used for the development of an integrated optical trap system to achieve repeated intra-cavity optical loading.

The device is also able to be applied to other suspension systems, such as electric traps, magnetic traps and composite traps of light, electricity and magnetism.

Figure 1:
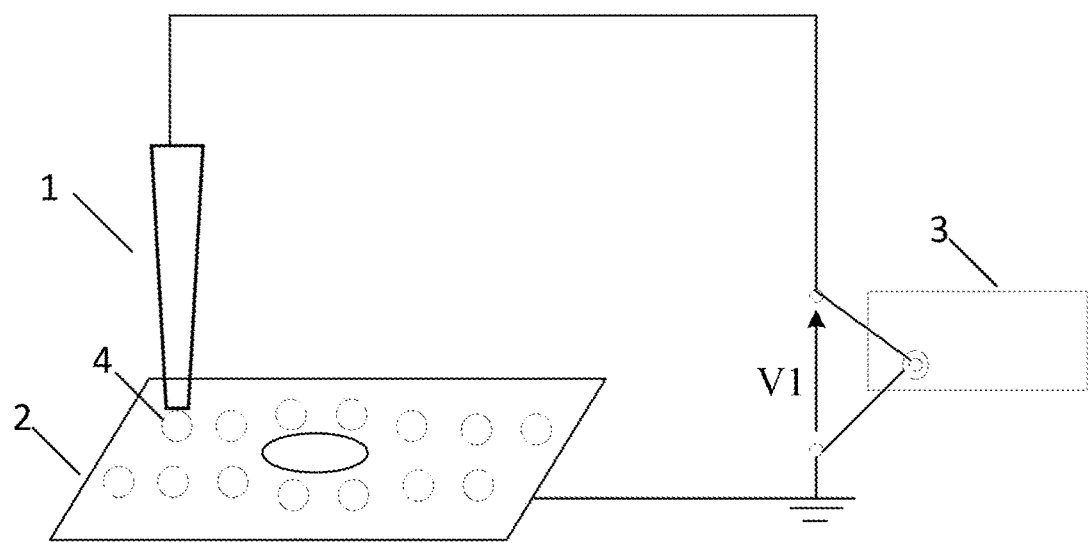
FIG. 1 shows a voltage V1 is applied between a probe and an upper electrode plate of a probe-based bidirectional electrophoretic force optical trap loading device provided by the present invention.

In the drawings, 1: probe; 2: upper electrode plate; 3: power supply; 4: target particle; 5: optical trap; 6: lower electrode plate 7: displacement adjuster; 8: control unit.

DETAILED DESCRIPTION OF THE PREFERRED EMBODIMENT

A probe-based bidirectional electrophoretic force optical trap loading method and the principle thereof are described as follows.

In vacuum environment, when a charged probe is close to target particles on an upper electrode plate, the target particles are adsorbed by the probe and detached from the upper electrode plate under an action of a bidirectional electrophoretic force; and then the probe with the target particles is moved over an optical trap, a central hole of the upper electrode plate is aligned with a center of the optical trap, so that the probe is also aligned with the center of the optical trap; an electric field between the probe and the upper electrode plate is switched during a polar relaxation time of the target particles, and the target particles are released by the probe under an action of a reverse bidirectional electrophoretic force; and then under an action of the electric field between the probe and the upper electrode plate, the target particles fall through the central hole of the upper electrode plate, a falling speed of the target particles is adjusted by applying an electric field between the upper electrode plate and the lower electrode plate which is provided under the optical trap, so that the target particles enter an effective capture range of the optical trap and captured by the optical trap.

In vacuum environment, the air damping is too small, the target particles after detaching from the probe have a certain initial speed and are easy to escape from the effective capture area of the optical trap. Therefore, the falling speed of the target particles is controlled by the electric field between the upper electrode plate and the lower electrode plate, so that the target particles are unable to rush out of the effective capture area of the optical trap and are captured.

Moreover, it is obvious that the present invention is also able to be used in non-vacuum environment for those skilled in the art.

The present invention is further explained with accompanying drawings and embodiments as follows.

Figure 2:
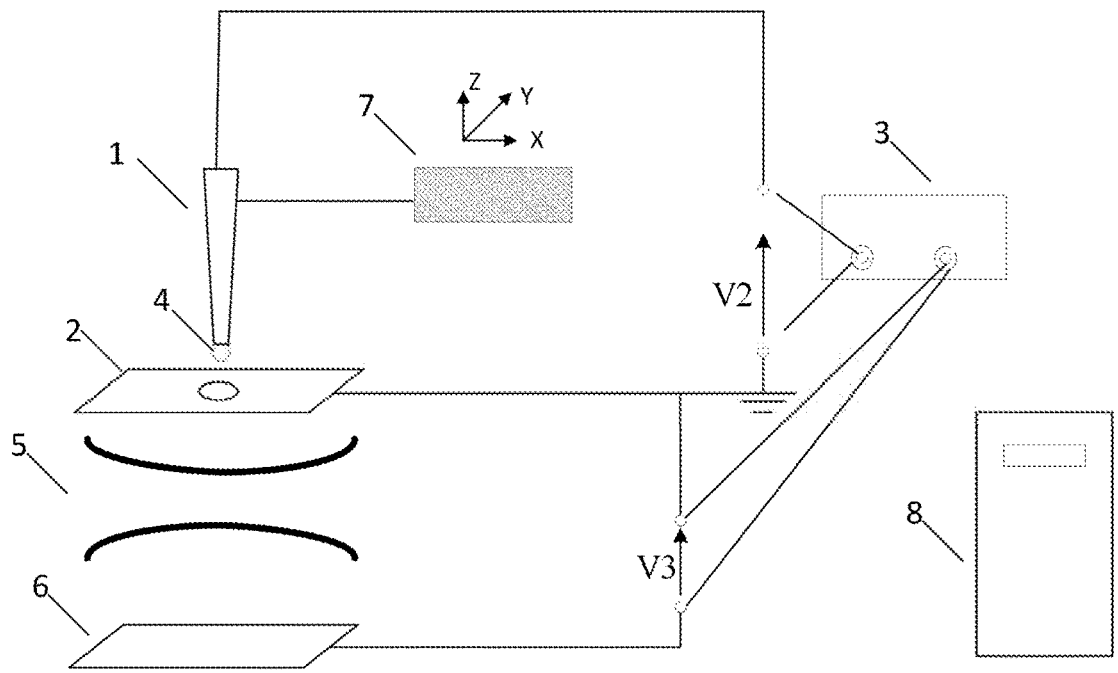
FIG. 2 is a structural schematic diagram of the probe-based bidirectional electrophoretic force optical trap loading device provided by the present invention.

Referring to FIGS. 1 and 2, a probe-based bidirectional electrophoretic force optical trap loading device is illustrated, which comprises a probe 1, an upper electrode plate 2, a power supply 3, one or more target particles 4, an optical trap 5, a lower electrode plate 6, a displacement adjuster 7 and a control unit 8, wherein the one or more target particles 4 are provided on a surface of the upper electrode plate 2, the power supply 3 is configured to control a voltage between the probe 1 and the upper electrode plate 2 for capturing and releasing the target particles, the displacement adjuster 7 is configured to precisely adjust a relative position between the probe 1 and the upper electrode plate 2; after being released from the probe 1, the target particles 4 fall through a central hole of the upper electrode plate 2, and then are adjusted in falling speed by an electric field between the upper electrode plate 2 and the lower electrode plate 6, and then are captured after entering an effective capture range of the optical trap; the control unit 8 is configured to control the displacement adjuster 7, and to control voltages V1, V2 and V3 of the power supply 3 and a turning-on time of the optical trap 5 by timing.

An operation method of the above-mentioned probe-based bidirectional electrophoretic force optical trap loading device is as follows.

A vacuum degree is in a range of $10^{-6}$ to $10^{-2}$ mbar.

The target particles are silica microspheres with a diameter of 5 μm, the upper electrode plate is a conductive silicon wafer, the probe is made from processed tungsten.

The voltage V1 is in the range of 0 to 5 V, the voltage V2 is in the range of −1000 V to −400 V, the switching time between the voltage V1 and the voltage V2 is smaller than 0.1 ms, the pulse width of the voltage V2 is in the range of 1 ms to 10 ms, the voltage V3 is in the range of 0 to 10 V, the voltages V1, V2 and V3 are generated by the power supply; the optical trap is formed by a focused beam emitted by a laser with a wavelength of 1064 nm, the effective capture area of the optical trap is micron scale; the displacement adjuster and the voltages are precisely controlled by the control unit.

Figure 4:
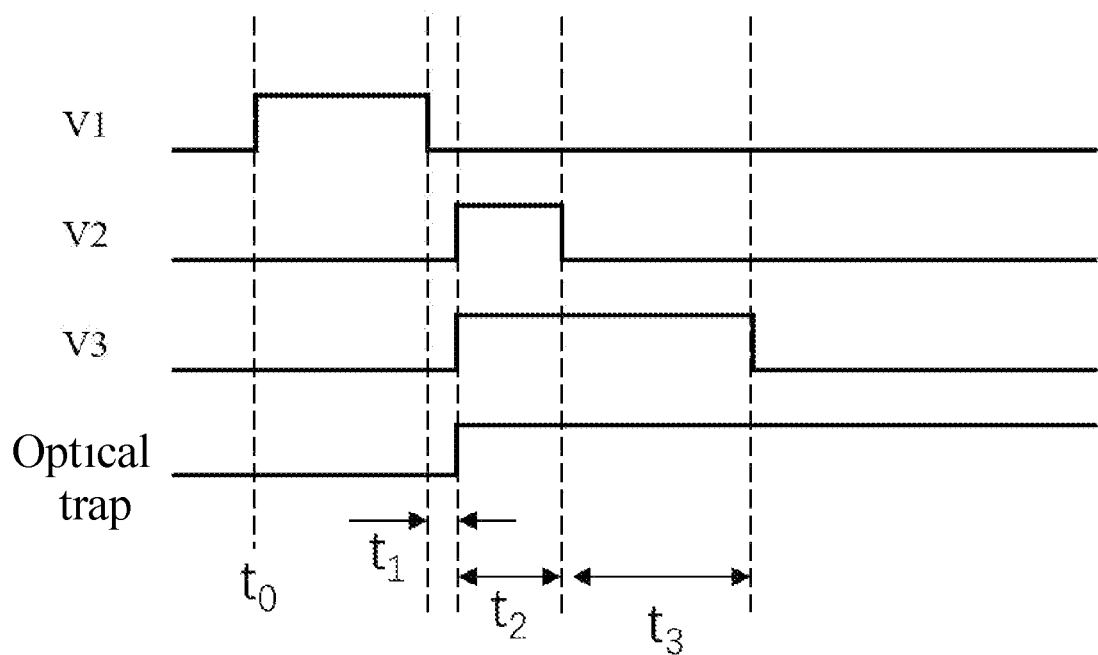
FIG. 4 is a control timing diagram of a probe-based bidirectional electrophoretic force optical trap loading method provided by the present invention.

Referring to FIG. 4, the operation method of the device comprises steps of:

(A) at $t_0=0$, turning on the power supply 3, and capturing the target particles through the probe by applying the voltage V1 between the probe and the upper electrode plate;

(B) moving the probe over the optical trap, and locating the target particles to be released over the optical trap by adjusting the displacement adjuster;

(C) turning on the optical trap, and applying the voltage V3 between the upper electrode plate and the lower electrode plate which is provided under the optical trap;

(D) during time $t_1$, switching the voltage between the probe and the upper electrode plate from V1 to V2, maintaining the voltage V2 for time $t_2$, desorbing the target particles from the probe, and decelerating the desorbed target particles under an action of the voltage V3 between the upper electrode plate and the lower electrode plate which is provided under the optical trap; and (E) the desorbed target particles entering an effective capture area of the optical trap after time $t_3$, capturing the desorbed target particles by the optical trap, and turning off the power supply.

The above-mentioned embodiments are part of the implementation means of the present invention, which are specifically and detailedly described. However, the above-mentioned embodiments should not be construed as a limitation of the present invention. It should be pointed out that for those skilled in the art, without departing from the concept of the present invention, any modifications and improvements are able to be made, which all fall within the protection scope of the present invention.

Examples of these modifications and improvements are as follows.

(1) Based on different capturing optical paths, the formed optical trap is able to be a single-beam optical trap or a double-beam optical trap.

(2) The target particles are optically homogeneous dielectric particles with known size, density, and scattering properties. Their dimensions are ranged from nanometers to micrometers.

(3) The environment where the optical trap and the ion trap are located is able to be air or vacuum; that is, the method and the device provided by the present invention are also able to be used for particle optical suspension under atmospheric pressure.

(4) The ion trap is not limited to the Paul trap mentioned in the embodiments of the present invention, but is also able to be other types of ion traps. Its structure is not limited to a linear ion trap structure, and is also able to be other types of structures.

Figure 3:
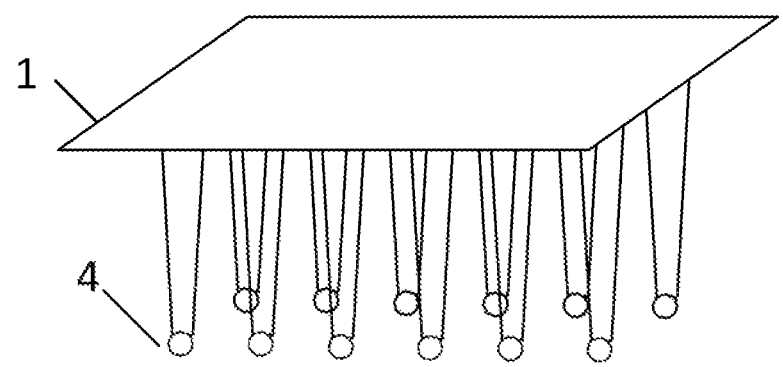
FIG. 3 is a structural schematic diagram of an arrayed probe of the probe-based bidirectional electrophoretic force optical trap loading device provided by the present invention.

(5) In the present invention, the capture operation of particles on the probe needs the assistance of a microscopic system. For an integrated system, an arrayed microsphere capture probe system is able to be prepared by the arrayed probe under microscopic conditions, as shown in FIG. 3, and then the arrayed probe is integrated into the optical trap, so that the repeated integrated optical trap intra-cavity loading is realized by the loading particle which is selected by the single probe of the arrayed probe every time.

The described technical features are able to be combined. For the sake of brevity, not all possible combinations of individual technical features are described. However, as long as there is no contradiction in the combination of these technical features, the combination of these technical features should be considered to be within the scope of the description. The protection scope of the present invention should be determined by the appended claims.

What is claimed is:

1. A probe-based bidirectional electrophoretic force optical trap loading method comprising steps of:
   (1) in vacuum or air environment, detaching target particles from an upper electrode plate and capturing the target particles by a micro-scale probe based on a bidirectional electrophoretic force;
   (2) moving the probe with the target particles over an optical trap, forming a reverse bidirectional electrophoretic force by applying a reverse electric field between the probe with the target particles and the upper electrode plate, wherein the reverse electric field is applied during a polar relaxation time of the target particles, and desorbing the target particles from the probe; and
   (3) turning on the optical trap, applying an electric field between the upper electrode plate and a lower electrode plate, adjusting a speed of the desorbed target particles through the electric field at which the optical trap is able to capture the desorbed target particles, the desorbed target particles moving to an effective capture range of the optical trap, and turning off the reverse electric field in the step (2) and the electric field in the step (3) when the desorbed target particles are trapped.

2. The probe-based bidirectional electrophoretic force optical trap loading method according to claim 1, wherein the probe has an arrayed structure for releasing the target particles and capturing the target particles by the optical trap for many times.

3. The probe-based bidirectional electrophoretic force optical trap loading method according to claim 1, wherein a position of the probe is movable.

4. A probe-based bidirectional electrophoretic force optical trap loading device using the probe-based bidirectional electrophoretic force optical trap loading method according to claim 1, the device comprising a probe, an upper electrode plate, a power supply, an optical trap, a lower electrode plate, a displacement adjuster and a control unit, wherein:
   one or more target particles are provided on a surface of the upper electrode plate;
   the upper electrode plate has a central hole;

the power supply is configured to control a voltage between the probe and the upper electrode plate and a voltage between the upper electrode plate and the lower electrode plate;

the displacement adjuster is configured to adjust a relative position between the probe and the upper electrode plate;

after desorbing from the probe, the target particles fall through the central hole of the upper electrode plate, and then are adjusted in falling speed by an electric field between the upper electrode plate and the lower electrode plate, and then are captured after entering an effective capture range of the optical trap; the control unit is configured to control the displacement adjuster, and to control voltages V1, V2 and V3 of the power supply and a turning-on time of the optical trap by timing.

5. The probe-based bidirectional electrophoretic force optical trap loading device according to claim 4, wherein the probe is installed on the displacement adjuster.

6. The probe-based bidirectional electrophoretic force optical trap loading device according to claim 4, wherein an insulating layer is coated on a surface of the probe for avoiding short-circuit of the probe.

7. An operation method of the probe-based bidirectional electrophoretic force optical trap loading device according to claim 4, wherein:

the target particles are silica microspheres with a diameter of 5 μm, a vacuum degree is in a range of $10^{-6}$ of $10^{-2}$ mbar, the voltage V1 is in a range of 0 to 5 V, the voltage V2 is in a range of −1000 V to −400 V, a switching time between the voltage V1 and the voltage V2 is smaller than 0.1 ms, a pulse width of the voltage V2 is in a range of 1 ms to 10 ms, the voltage V3 is in a range of 0 to 10 V, the optical trap is formed by a focused beam emitted by a laser with a wavelength of 1064 nm;

the operation method comprises steps of:

(A) at $t_0=0$, capturing the target particles through the probe by applying the voltage V1 between the probe and the upper electrode plate;

(B) moving the probe over the optical trap, and locating the target particles to be released over the optical trap by adjusting the displacement adjuster;

(C) turning on the optical trap, and applying the voltage V3 between the upper electrode plate and the lower electrode plate which is provided under the optical trap;

(D) during time $t_1$, switching the voltage between the probe and the upper electrode plate from V1 to V2, maintaining the voltage V2 for time $t_2$, desorbing the target particles from the probe, and decelerating the desorbed target particles under an action of the voltage V3 between the upper electrode plate and the lower electrode plate which is provided under the optical trap; and (E) the desorbed target particles entering an effective capture area of the optical trap after time $t_3$, capturing the desorbed target particles by the optical trap, and turning off the power supply.

* * * * *